United States Patent [19]

Araya et al.

[11] Patent Number: 4,705,674

[45] Date of Patent: * Nov. 10, 1987

[54] SYNTHESIS OF ZEOLITE EU-13 FROM A REACTION MIXTURE CONTAINING TETRAMETHYLAMMONIUM COMPOUND

[75] Inventors: Abraham Araya, Merseyside, England; Barrie M. Lowe, Edinburgh, Scotland

[73] Assignee: Imperial Chemical Industries PLC, London, England

[*] Notice: The portion of the term of this patent subsequent to Apr. 8, 2003 has been disclaimed.

[21] Appl. No.: 804,631

[22] Filed: Dec. 5, 1985

Related U.S. Application Data

[63] Continuation of Ser. No. 538,472, Oct. 3, 1983, abandoned.

[30] Foreign Application Priority Data

Oct. 5, 1982 [GB] United Kingdom ............... 8228353

[51] Int. Cl.$^4$ ............................................. C01B 35/10
[52] U.S. Cl. .................................. 423/277; 423/326; 423/328; 423/329; 502/60; 502/77; 502/202
[58] Field of Search ............... 423/326, 328, 329, 277; 502/60, 77, 202

[56] References Cited

U.S. PATENT DOCUMENTS

| | | | |
|---|---|---|---|
| 3,642,434 | 2/1972 | Dwyer ................................. | 423/329 |
| 4,060,590 | 11/1977 | Whittam et al. ..................... | 423/329 |
| 4,076,842 | 2/1978 | Plank et al. ......................... | 423/329 |
| 4,187,283 | 2/1980 | Kokotailo et al. ................... | 423/328 |
| 4,397,827 | 8/1983 | Chu ..................................... | 423/328 |
| 4,528,171 | 7/1985 | Casci et al. ......................... | 423/277 |
| 4,537,754 | 8/1985 | Casci et al. ......................... | 423/277 |
| 4,578,259 | 3/1986 | Morimoto ........................... | 423/329 |
| 4,581,211 | 4/1986 | Araya et al. ........................ | 423/329 |
| 4,581,212 | 4/1986 | Araya et al. ........................ | 423/277 |
| 4,593,138 | 1/1986 | Casci et al. ......................... | 585/481 |
| 4,599,475 | 7/1986 | Kresge et al. ....................... | 585/481 |
| 4,619,820 | 10/1986 | Valyocsik ........................... | 502/60 |

OTHER PUBLICATIONS

Parker et al., Zeolites, vol. 3, Jan. 1983, "Zeolites KZ-1 and KZ-2".
Abraham Araya et al., "The Synthesis and Thermal Behavior of Zeolite Ω", Zeolites, vol. 4, No. 3, Jul. 1984, pp. 263-269.
B. M. Lok et al., "The Role of Organic Molecules in Molecular Sieve Synthesis", Zeolites, vol. 3, No. 4, Oct. 1983, pp. 282-291.
A. C. Rohrman et al., "The Framework Topology of ZSM-23 A High Silica Zeolite", Zeolites, vol. 5, No. 6, 6 Nov. 1985, pp. 352-354.

Primary Examiner—John Doll
Assistant Examiner—Jackson Leeds
Attorney, Agent, or Firm—Cushman, Darby & Cushman

[57] ABSTRACT

A new zeolite material designated EU-13 has a molar composition expressed by the formula:

0.8 to 3.0 $R_2O$: $Y_2O_3$: at least 10 $XO_2$: 0 to 2000 $H_2$ wherein R is a monovalent cation or (1/n) of a cation of valency n, X is silicon and/or germanium, Y is one or more of aluminium, iron, chromium, vanadium, molybdenum, arsenic, antimony, manganese, gallium or boron and $H_2O$ is water of hydration additional to water notionally present when R is H, and having an X-ray powder diffraction pattern substantially as set out in Table 1. The zeolite material is prepared from a reaction mixture containing $XO_2$ (preferably silica), $Y_2O_3$ (preferably alumina) and a methylated quaternary ammonium or phosphonium compound, most preferably a tetramethylammonium compound.

5 Claims, 3 Drawing Figures

X-RAY POWDER DIFFRACTION PATTERN OF EU13 (EXAMPLE 2 AS MADE)

Fig. 1. X-RAY POWDER DIFFRACTION PATTERN OF EU13 (EXAMPLE 2 AS MADE)

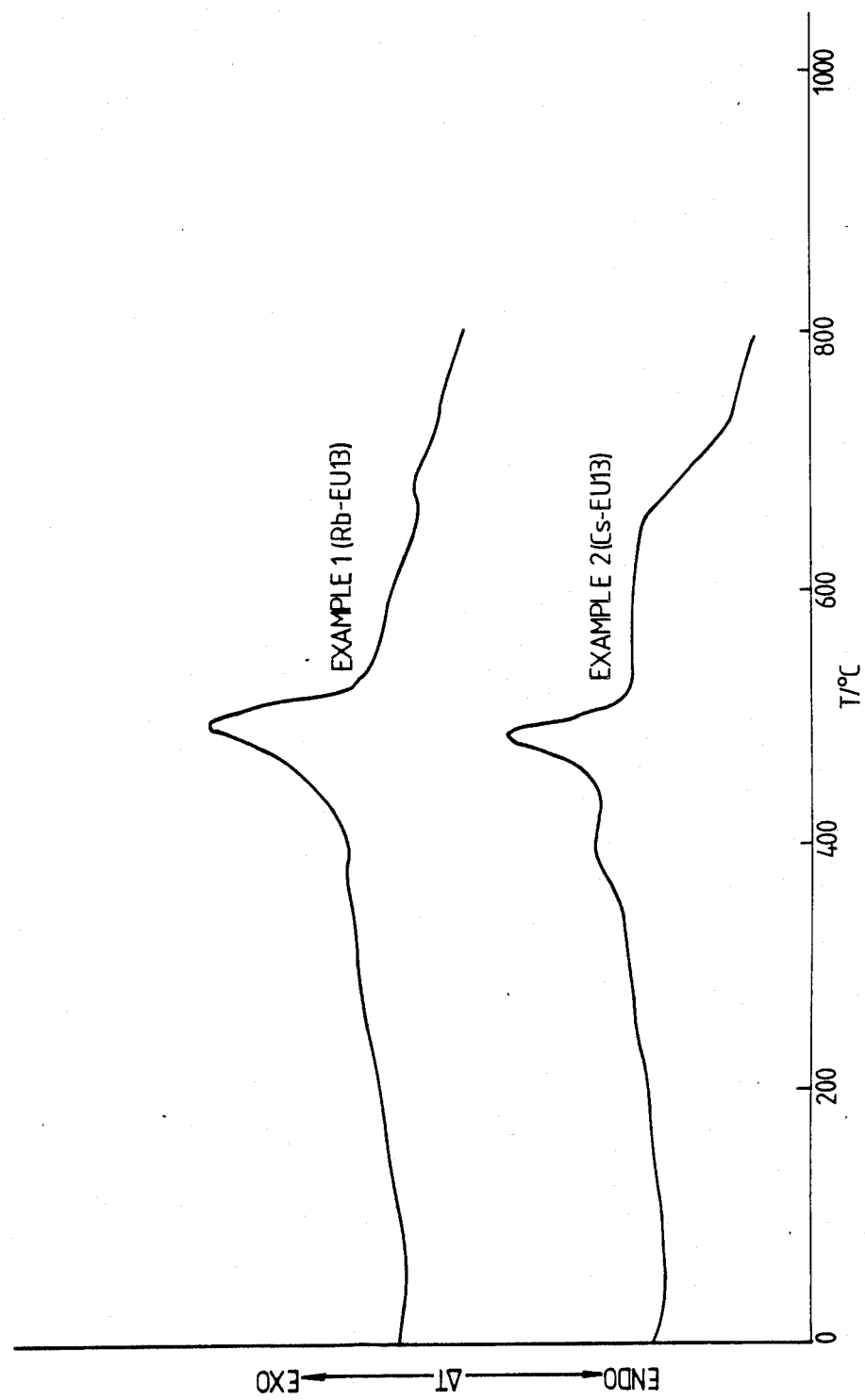
Fig. 3. DIFFERENTIAL THERMAL ANALYSIS OF EU-13

SYNTHESIS OF ZEOLITE EU-13 FROM A REACTION MIXTURE CONTAINING TETRAMETHYLAMMONIUM COMPOUND

This is a continuation of application Ser. No. 538,472, filed Oct. 3, 1983, now abandoned.

THE PRESENT INVENTION relates to a novel zeolite material, hereinafter referred to as EU-13, and to methods for its preparation.

Aluminosilicate zeolites are now widely used in industry. Some occur only in nature, others are only available as a result of chemical synthesis and some are available in both natural and synthetic forms. Synthetic zeolites are attracting more and more attention and it is becoming more and more possible to control the preparation of such zeolites so as to tailor their properties to particular needs.

According to the present invention a crystalline zeolite material, EU-13, has a composition (in terms of mole ratios of oxides) expressed by the formula:

0.8 to 3.0 $R_2O$:$Y_2O_3$:at least 10 $XO_2$:0 to 2000 $H_2O$ wherein R is a monovalent cation or (1/n) of a cation of valency n, X is silicon and/or germanium, Y is one or more of aluminium, iron, chromium, vanadium, molybdenum, arsenic, antimony, manganese, gallium or boron and $H_2O$ is water of hydration addition to water notionally present when R is H, and having an X-ray powder diffraction pattern substantially as set out in Table 1 (as determined by standard technique using copper $K\alpha$ radiation) and substantially as shown in FIG. 1.

TABLE 1

| EU13 "as made" | | EU13 calcined[a] | |
|---|---|---|---|
| d(A) | I/Io | d(A) | I/Io |
| 11.2 | 42 | 11.1 | 70 |
| 10.8 | 46 | 10.8 | 73 |
| 10.0 | 22 | 9.96 | 28 |
| 7.79 | 27 | 7.78 | 47 |
| 6.82 | 1 | 6.84 | 5 |
| 6.08 | 5 | 6.07 | 7 |
| 5.84 | 5 | 5.83 | 10 |
| 5.60 | 9 | 5.58 | 15 |
| 5.41 | 8 | 5.41 | 13 |
| 4.85 | 12 | 4.88 | 11 |
| 4.51 | 63 | 4.51 | 93 |
| 4.44 | 20 | 4.42 | 20 |
| 4.25 | 73 | 4.24 | 76 |
| 4.15 | 19 | 4.14 | 16 |
| | | 4.03 | 7 |
| 3.89 | 100 | 3.89 | 100 |
| 3.72 | 77 | 3.70 | 83 |
| 3.61 | 63 | 3.60 | 67 |
| 3.55 | 39 | 3.53 | 45 |
| 3.43 | 51 | 3.42 | 57 |
| 3.35 | 9 | | |
| 3.28 | 8 | 3.28 | 12 |
| 3.16 | 10 | 3.15 | 14 |
| 3.08 | 2 | 3.07 | 3 |
| 3.03 | 6 | 3.03 | 8 |
| 2.980 | 4 | 2.980 | 2 |
| 2.833 | 13 | 2.824 | 15 |
| 2.782 | 3 | 2.782 | 5 |
| 2.708 | 1 | 2.708 | 2 |
| 2.631 | 6 | 2.623 | 6 |
| 2.534 | 30 | 2.528 | 34 |
| 2.463 | 13 | 2.459 | 14 |
| 2.392 | 4 | 2.387 | 7 |
| 2.334 | 11 | 2.332 | 10 |

[a] In air at 550° C. for 16 hours

This definition includes both freshly prepared EU-13 ("freshly prepared" means the product of synthesis and washing, with optional drying, as hereinafter described) and also forms of the zeolite resulting from dehydration and/or calcination and/or ion exchange. In freshly prepared EU-13, R may include an alkali metal cation and/or ammonium and hydrogen and may include nitrogen-containing organic compounds as described below. These organic components are hereinafter referred to, for convenience only, as A.

As EU-13 is a zeolite, the organic component(s) must be held within the zeolite framework. This nitrogen-containing organic material does not constitute part of the composition for the purposes of definition. Thus, a zeolite EU-13 as made typically has the molar composition:

0 to 2.0 $M_2O$:0 to 300 A:$Y_2O_3$:at least 5 $XO_2$:0 to 2000 $H_2O$ where M is an alkali metal, ammonium or hydrogen. When the organic material is a quaternary compound, "A" refers to the compound defined as its oxide.

In calcined forms of zeolite EU-13, R may be any cation including hydrogen since the organic component is either burnt out in the presence of air, leaving hydrogen as the other balancing cation, or it is removed prior to calcination for example by dissolution in water or an organic solvent. The zeolite is readily converted to the hydrogen form by ion exchange with hydrogen ions and/or with ammonium ions followed by calcination.

The X-ray data for zeolite EU-13 show a strong similarity to the corresponding data for zeolite ZSM-23, which has been described in U.S. Pat. No. 4,076,842 and it is believed that the two zeolites are members of the same family. Table 2 shows the X-ray data for zeolite ZSM-23, as reported in Table IV of U.S. Pat. No. 4,076,842.

TABLE 2

| X-ray data of Zeolite ZSM23 | | | |
|---|---|---|---|
| d(A) | I/Io | d(A) | I/Io |
| 11.42 | 20 | 3.72 | 79 |
| 11.01 | 45 | 3.62 | 71 |
| 10.09 | 18 | 3.53 | 40 |
| 7.86 | 18 | 3.44 | 45 |
| 6.08 | 4 | 3.35 | 7 |
| 5.71 | 2 | 3.30 | 8 |
| 5.58 | 4 | 3.16 | 11 |
| 5.43 | 8 | 3.04 | 6 |
| 4.90 | 12 | 2.986 | 5 |
| 4.53 | 60 | 2.836 | 10 |
| 4.44 | 18 | 2.714 | 1 |
| 4.35 | 11 | 2.635 | 4 |
| 4.26 | 75 | 2.532 | 29 |
| 4.15 | 26 | 2.498 | 9 |
| 4.10 | 27 | 2.468 | 13 |
| 4.05 | 21 | 2.395 | 5 |
| 3.91 | 100 | 2.335 | 9 |
| 3.79 | 19 | | |

Zeolite EU-13 may be prepared by reacting an aqueous mixture containing sources of at least one oxide $XO_2$, at least one oxide $Y_2O_3$ and at least one methylated quaternary ammonium or methylated quaternary phosphonium compound, the reaction mixture having the molar composition:

$XO_2/Y_2O_3$ at least 10 preferably in the range 10 to 600 more preferably 20 to 120, $M^1OH/XO_2$ in the range 0.4 to 1.0, preferably 0.1 to 0.65

$H_2O/XO_2$ in the range 10 to 100, preferably 20 to 75

$A/XO_2$ in the range 0.01 to 0.5, preferably 0.02 to 0.25

$M^2Z/XO_2$ in the range 0 to 0.5, preferably 0 to 0.3 wherein each of $M^1$ and $M^2$ represents an alkali metal, ammonium or hydrogen, A represents the methylated quaternary compound as hereinbefore defined, X and Y have the meanings as hereinbefore defined, and Z represents an acid radical.

Preferred methylated quaternary compounds are tetramethylammonium compounds, for example the hydroxide and bromide.

The Applicants believe that it may be possible to synthesise zeolite EU-13 without the use of alkali metals in the reaction mixture. If used, however, suitable alkali metals include sodium, potassium, lithium, rubidium and caesium and of these it is preferred to use potassium, lithium or rubidium. Optionally, the reaction mixture may include more than one alkali metal, for example mixtures of rubidium and potassium compounds or mixtures of potassium and caesium compounds.

The preferred oxide $XO_2$ is silica ($SiO_2$) and the preferred oxide $Y_2O_3$ is alumina ($Al_2O_3$).

The silica source can be any of those commonly considered for use in synthesising zeolites, for example powdered solid silica, silica acid, colloidal silica or dissolved silica. Among the powdered silicas usable are precipitated silica, especially those made by precipitation from an alkali metal silicate solution, such as the type known as "KS 300" made by AKZO, and similar products, aerosil silicas, fume silicas such as "CAB-O-SIL" M5 and silica gels suitable in grades for use in reinforcing pigments for rubber or silicone rubber. Colloidal silicas of various particle sizes may be used, for example 10 to 15 or 40 to 50 microns, as sold under the Registered Trade Marks "LUDOX", "NALCOAG" and "SYTON". The usable dissolved silicas include commercially available waterglass silicates containing 0.5 to 6.0, especially 2.0 to 4.0, mols of $SiO_2$ per mol of alkali metal oxide, "active" alkali metal silicates as defined in UK Pat. No. 1,193,254, and silicates made by dissolving silica in alkali metal hydroxide or quaternary ammonium hydroxide or a mixture thereof.

The alumina source is most conveniently a soluble aluminate, but aluminium, an aluminium salt, for example the chloride, nitrate, or sulphate, an aluminium alkoxide or alumina itself, which should preferably be in a hydrated or hydratable form such as colloidal alumina, pseudoboehmite, boehmite, gamma alumina or the alpha or beta trihydrate can also be used.

The reaction mixture is conveniently reacted under autogeneous pressure, optionally with added gas, for example nitrogen, at a temperature in the range 80° to 250° C., more suitably 140° to 200° C., until crystals of zeolite EU-13 form, which can be from 1 hour to many months depending on the reactant composition and the operating temperature. Agitation is optional, but is preferable since it assists homogenisation of the reaction mixture and reduces the reaction time. Seeding of the reaction mixture with EU-13 crystals can also be advantageous if EU-13 crystals dispersed in their mother liquor are used.

At the end of the reaction, the solid phase is collected on a filter and washed and is then ready for further steps such as drying, calcination and ion-exchange.

Any alkali metal ions present in the product of the reaction have to be at least partly removed in order to prepare the catalytically active hydrogen form of EU-13 and this can be done by ion exchange with an acid, especially a strong mineral acid such as hydrochloric acid or by way of the ammonium compound made by ion exchange with a solution of an ammonium salt such as ammonium chloride. Ion exchange can be carried out by slurrying once or several times with the ion-exchange solution. The zeolite is usually calcined after ion exchange but this may be effected before ion-exchange or during ion-exchange if the latter is carried out in a number of stages. Ion exchange can also be used to replace ions present in the "as made" form of the zeolite by other ions and this ion-exchanged form of the zeolite can also be converted, if desired, to the hydrogen form as described above.

Organic material incorporated in the zeolite during the synthesis can be removed by heating at temperatures up to 1,200° C. under atmospheric pressure or by heating at lower temperatures, under reduced pressure. Alternatively, organic material may be removed by dissolution in water or in a suitable organic solvent, if desired during ion-exchange. There is some evidence that EU-13 prepared using rubidium as the alkali metal loses its organic material more readily than EU-13 prepared from cesium-containing reaction mixtures. This may be because the caesium ions block the zeolite channels and thereby make it difficult for the organic material to be removed.

Zeolite EU-13 prepared by the method of the invention is useful as a catalyst and as a sorbent. Thus zeolite EU-13 may be used as a catalyst in the processes of polymerization, aromatisation, disproportionation, reforming, esterification, cracking, hydrocracking, dehydrocyclisation and dehydration reactions, for example the conversion of alkanols to lower olefins.

The zeolite and its method of preparation are illustrated by the following Examples in which:

FIG. 3 illustrates traces obtained in the differential thermal analysis of zeolite EU-13.

EXAMPLES 1 TO 6

Zeolite EU-13 was prepared from synthesis mixtures having the compositions shown in Table 3 which were prepared as follows:

An aluminate solution was prepared by dissolving 1.04 g of alumina hydrate in a solution of 8.03 g of rubidium hydroxide monohydrate dissolved in 15 g of distilled water using a magnetic stirrer hot plate. This aluminate solution was then added to a mixture of 24.0 g CAB-O-SIL M5 silica, 24.4 g of a 25% (w/w) aqueous solution of tetramethylammonium hydroxide and 300 g of water in a litre plastic beaker. An additional 24 g of water was used to rinse the aluminate solution from the beaker and added to the reaction mixture. The mixture was stirred with a spatula until it appeared to be homogeneous.

The synthesis mixture was then placed in a stainless steel autoclave in which it was stirred at 300 r.p.m and allowed to react at 180° C. Crystallisation was complete in less than 258 hours in all cases.

Figure 1:
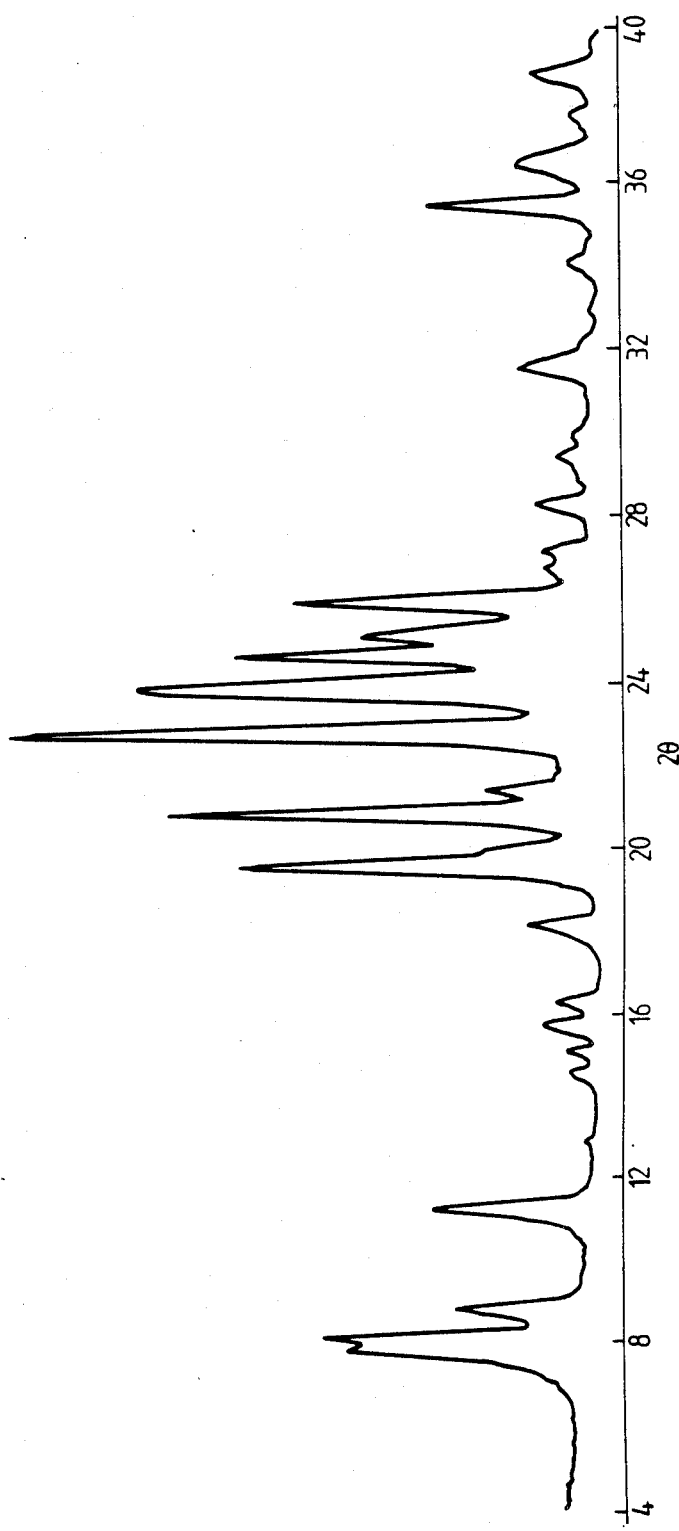
FIG. 1 illustrates a typical X-ray powder diffraction pattern for zeolite EU-13.

The zeolite was then filtered from the reaction mixture, washed with distilled water, dried at 120° C. and in some cases calcined as indicated. Analysis of the products showed that they were mainly EU-13 having the X-ray patterns substantially the same as that shown in Table 1. FIG. 1 illustrates a typical X-ray powder diffraction pattern for EU-13 (it is that for the "as made" zeolite of Example 2).

TABLE 3

| Example | Reaction Mixture composition | | | | |
|---|---|---|---|---|---|
| | $SiO_2$ | $Al_2O_3$ | $M_2O$ | $(TMA)_2O$ | $H_2O$ |
| 1 | 60 | 1 | $5Rb_2O$ | 5 | 3000 |
| 2 | 60 | 1 | $10Cs_2O$ | 10[a] | 3000 |
| 3 | 60 | 1 | $5K_2O$ | 5 | 3000 |
| 4[b] | 60 | 2 | $5Li_2O$ | 5 | 3000 |
| 5[c] | 60 | 1 | $5Li_2O$ | 5 | 3000 |
| 6[d] | 60 | 0.5 | $5Rb_2O$ | 5 | 3000 |

[a]TMA (tetramethylammonium) added as TMABr. In all other examples TMAOH was used.
[b]Example 4 gave a product of EU-13 zeolite which was contaminated with a small amount of sodalite and a trace of an unidentified material.
[c]Example 5 product was EU-13 and a trace of unidentified material.
[d]Example 6 product was EU-13 and quartz.

Figure 2:
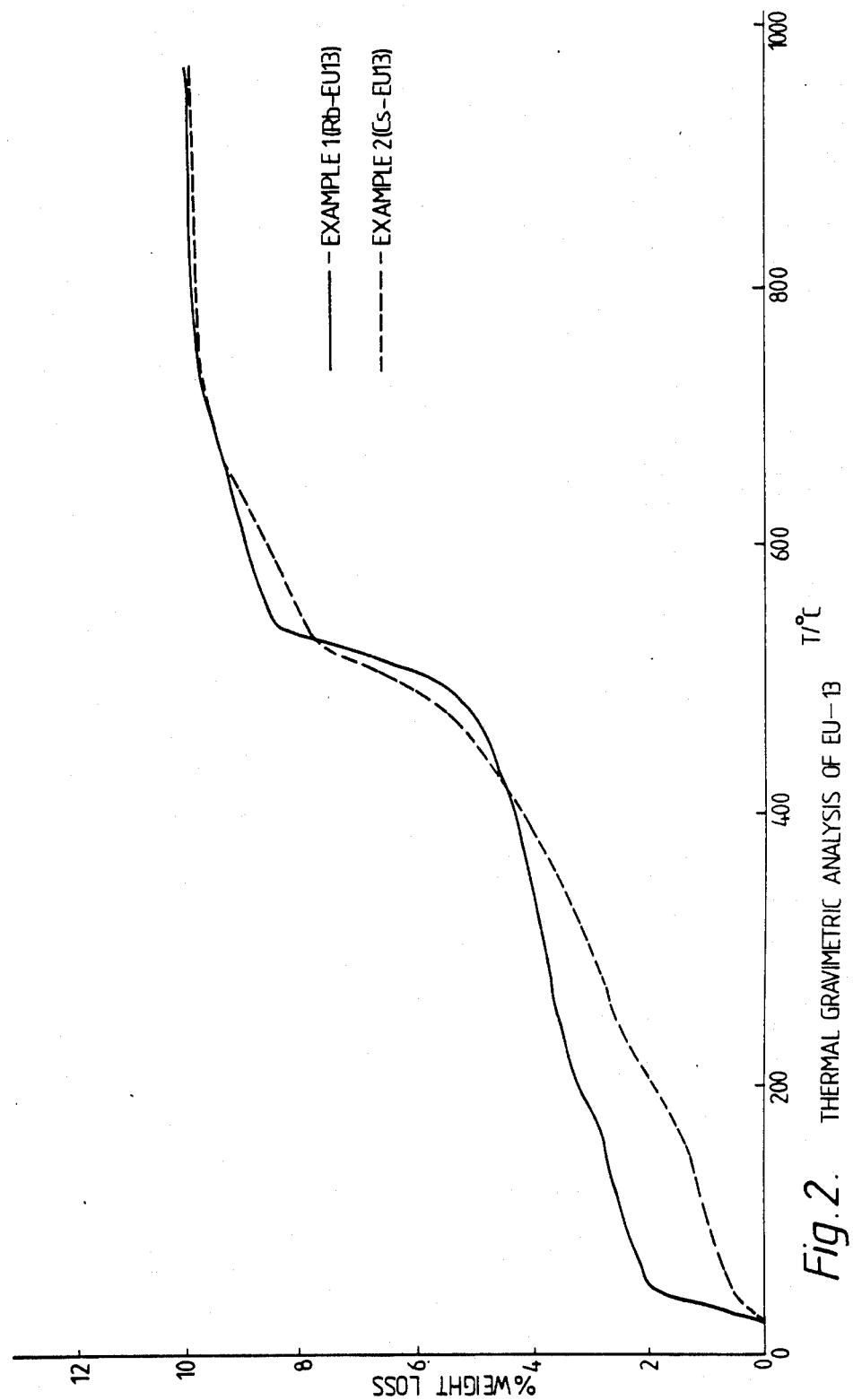
FIG. 2 illustrates traces obtained in the thermal gravimetric analysis of zeolite EU-13.

Samples of "as made" (i.e. not calcined) zeolite EU-13 as prepared in Examples 1 and 2 were subjected to thermal gravimetric analysis and the traces are shown in FIG. 2. The initial sharp weight loss shown by the Example 1 zeolite (Rb) but not by the Example 2 material (Cs) suggests that the water is more loosely bound in the rubidium zeolite than in the caesium one. In the latter case the large cation may obstruct the movement of water through the channels.

It appears from the traces that the Rb zeolite loses its organic material more readily than the Cs one. This was confirmed by further calcination experiments. Even after heating overnight at 1110° C. the Cs zeolite remained grey whereas the Rb zeolite calcined to a white powder at 600° C. The difficulty encountered in the calcination of the Cs zeolite is probably due to caesium ions which may block the zeolite channels and thereby make it difficult to remove the organic material. The weight losses determined by thermal gravimetric analysis are shown in Table 4.

TABLE 4

| Sample | % weight loss at | | | | |
|---|---|---|---|---|---|
| | 0 to 200° C. | 200 to 1000° C. | 0 to 400° C. | 400° C. to 1000° C. | 0 to 1000° C. |
| Example 1 | 3.5 | 6.5 | 4.5 | 5.5 | 10.0 |
| Example 2 | 1.3 | 8.5 | 4.3 | 5.5 | 9.8 |

The weight loss below 400° C. is probably a good measure of the water content of both zeolites and in the case of the Example 1 material the weight loss between 400° and 1000° C. probably represents the total organic content. However, the calcination experiments hereinbefore mentioned suggest that to obtain the total organic content of the Example 2 zeolite it would be necessary to heat it well above 1100° C.

Samples of "as made" EU-13 as prepared in Examples 1 and 2 were analysed by differential thermal analysis and the traces are shown in FIG. 3. Both exhibit a sharp exotherm centred at approximately 500° C. and coincident with the sharp weight loss shown in the thermal gravimetric analysis traces. The Example 2 zeolite also shows a small exotherm at 400° C. which does not appear to be related to a weight loss. Zeolite EU-13 has a very low powder density and it was possible to pack only 2.5 mg into the differential thermal analysis crucible. Hence, it may be that some endotherms and exotherms have not been detected.

The calcined products of Examples 1 and 2 were analysed by X-ray fluorescence and the results (all figures are in % w/w) are shown in Table 5. In the case of the Example 2 zeolite the shortfall in the total probably represents organic material not removed by calcination at 1000° C.: this has been allowed for in the calculation of the empirical formulae.

TABLE 5

| | Example 1 | Example 2 |
|---|---|---|
| $SiO_2$ | 94.35 | 91.69 |
| $Al_2O_3$ | 3.67 | 3.41 |
| $Rb_2O$ | 2.30 | — |
| $Cs_2O$ | — | 2.51 |
| $Na_2O$ | 0.018 | −0.22 |
| $K_2O$ | 0.060 | −0.009 |
| TOTAL (including trace elements) | 100.51 | 97.54 |

If it is assumed that all the water is lost on heating to 200° C., the empirical formulae based on the figures in Table 5 are:

Example 1 zeolite: $43.6SiO_2:Al_2O_3:0.34Rb_2O:1.23(TMA)_2O:6.0H_2O$

Example 2 zeolite: $45.7SiO_2:A_2O_3:0.27Cs_2O:2.16(TMA)_2O:2.39H_2O$

Alternatively assuming all the water is lost by 400° C., the empirical formulae are:

Example 1 zeolite: $43.6SiO_2:Al_2O_3:0.34Rb_2O:1.04(TMA)_2O:7.74H_2O$

Example 2 zeolite: $45.7SiO_2:Al_2O_3:0.27Cs_2O:1.55(TMA)_2O:7.93H_2O$

Electron micrographs of zeolite EU-13 show that it has an ill-defined platy appearance. The sample of Example 2 material appeared to be more crystalline than the Example 1 material.

We claim:

1. A method of making a crystalline zeolite material, designated EU-13 having a molar composition (in terms of mole ratios of oxides) expressed by the formula:

0.8 to 3.0 $R_2O:Y_2O_3$:at least 10 $XO_2$:0 to 2000 $H_2O$ wherein R is a monovalent cation or (1/n) of a cation of valency n, X is silicon and/or germanium, Y is one or more of aluminium, iron, chromium, vanadium, molybdenum, arsenic, antimony, manganese, gallium or boron and $H_2O$ is water of hydration additional to water notionally present when R is H, and having an X-ray powder diffraction pattern as set out in Table 1 (as determined by standard technique using copper $K\alpha$ radiation) and as shown in FIG. 1, which comprises reacting an aqueous mixture containing sources of at least one oxide $XO_2$, at least one oxide $Y_2O_3$ and a tetramethylammonium compound, the reaction mixture having the molar composition:

$XO_2/Y_2O_3$ in the range 20 to 120
$M^1OH/XO_2$ in the range 0.04 to 1.0
$H_2O/XO_2$ in the range 10 to 100
$A/XO_2$ in the range 0.01 to 0.5
$M^2Z/XO_2$ in the range 0 to 0.5 wherein each of $M^1$ and $M^2$ represents an alkali metal selected from potassium, rubidium, lithium and caesium, ammonium or hydrogen, A represents the tetramethylammonium compound and Z represents a strong acid radical.

2. A method as claimed in claim 1 wherein the reaction mixture has a molar composition in which $XO_2/Y_2O_3$ is in the range 20 to 120
$M^1OH/XO_2$ is in the range 0.1 to 0.65
$H_2O/XO_2$ is in the range 20 to 75
$A/XO_2$ is in the range 0.02 to 0.25
$M^2Z/XO_2$ is in the range 0 to 0.3.

3. A method as claimed in claim 1 in which the tetramethylammonium compound is tetramethylammonium hydroxide or bromide.

4. A method as claimed in claim 1 in which $M^1$, and $M^2$ if present, is/are at least one of potassium, lithium and rubidium.

5. A method of making the crystalline zeolitic material designated EU-13 which comprises reacting an aqueous mixture containing sources of at least one oxide $XO_2$, at least one oxide $Y_2O_3$ and a tetramethylammonium compound, the reaction mixture having the molar composition:

$XO_2/Y_2O_3$ in the range 20 to 120
$M^1OH/XO_2$ in the range 0.04 to 1.0
$H_2O/XO_2$ in the range 10 to 100
$A/XO_2$ in the range 0.01 to 0.5
$M^2Z/XO_2$ in the range 0 to 0.5 wherein $M^1$ and $M^2$ represent rubidium, A represents tetramethylammonium, X is silicon and/or germanium, Y is one or more of aluminium, iron, chromium, vanadium, molybdenum, arsenic, antimony, manganese, gallium and boron and Z represents a strong acid radical.

* * * * *